United States Patent
Terai et al.

(10) Patent No.: US 7,238,103 B2
(45) Date of Patent: Jul. 3, 2007

(54) REGISTER

(75) Inventors: Nobuhiro Terai, Aichi-ken (JP);
Yasuyuki Mitsui, Aichi-ken (JP);
Yasunobu Oda, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 64 days.

(21) Appl. No.: 11/098,446

(22) Filed: Apr. 5, 2005

(65) Prior Publication Data
US 2005/0245189 A1    Nov. 3, 2005

(30) Foreign Application Priority Data
Apr. 28, 2004    (JP)    .............................. 2004-133170

(51) Int. Cl.
*B60H 1/34*    (2006.01)
(52) U.S. Cl. ..................................... 454/155
(58) Field of Classification Search ................. 454/155
See application file for complete search history.

(56) References Cited
U.S. PATENT DOCUMENTS
6,435,962 B1 *    8/2002    Herron et al. .............. 454/290

2002/0025774 A1 *    2/2002    Yamaguchi .................. 454/155
2004/0219874 A1 *    11/2004    Karadia ...................... 454/155

FOREIGN PATENT DOCUMENTS
JP    A-2004-034734    2/2004

* cited by examiner

*Primary Examiner*—Kenneth Rinehart
*Assistant Examiner*—Helena Kosanovic
(74) *Attorney, Agent, or Firm*—Posz Law Group, PLC

(57) ABSTRACT

A register includes a retainer, and a fin assembly. The retainer has an outlet opening. The fin assembly includes a plurality of fin members. The fin members are disposed in the retainer in a manner neighboring one after another. One of the neighboring paired fin members has a first end. The other one of the neighboring paired fin members has a second end facing the first end when the fin members swing to the close position. The register further includes an air deflector disposed between the first end and the second end, whereby deflecting the blowing direction of air flowing out from the outlet opening of the retainer outward when the fin members swing to the close position.

5 Claims, 5 Drawing Sheets

REGISTER

BACKGROUND OF THE INVENTION

1. Field of the Invention

The present invention relates to a register for adjusting the blowing direction of air supplied from an air conditioner.

2. Description of the Related Art

A register is disposed on a downstream side of air flow in an air conditioner in order to adjust the blowing direction of the air supplied from the air conditioner. A variety of such registers have been known conventionally. The registers are a component part which comprises a substantially cylinder-shaped retainer and a plurality of fin members disposed in the retainer. The fin members are swung to change their direction angles in order to adjust the blowing direction of air.

A register usually comprises a vertical fin assembly, and a horizontal fin assembly. The vertical fin assembly comprises a plurality of vertical fin members extending in the substantially vertical direction and disposed in a manner neighboring one after another. The horizontal fin assembly comprises a plurality of horizontal fin members extending in the substantially horizontal direction and disposed in a manner neighboring one after another. The vertical fin assembly adjusts the blowing direction of air in the right/left direction by swinging the vertical fin members, which are disposed in the right/left direction in a manner neighboring one after another, about the swing shafts. Likewise, the horizontal fin assembly adjusts the blowing direction of air in the up/down direction by swinging the horizontal fin members, which are disposed in the up/down direction in a manner neighboring one after another, about the swing shafts.

For example, a conventional register has been known in which the fin members of one of the fin assemblies are swung to open or close the outlet opening of the retainer in order to adjust the flow volume of air flowing out from the retainer to the outside.

FIG. 5 schematically illustrates a perspective view of the conventional register for adjusting the flow volume of air. Moreover, FIG. 6 schematically illustrates a cross-sectional view how the conventional register shown in FIG. 5 appears when it is cut along the plane "6" of FIG. 5.

As illustrated in FIGS. 5 and 6, a conventional register 100 comprises a substantially cylinder-shaped retainer 101, a vertical fin assembly (not shown in FIG. 5), and a horizontal fin assembly 106. As illustrated in FIG. 6, the vertical fin assembly is disposed in the retainer 101, and comprises a plurality of vertical fin members 102 disposed in the right/left direction in a manner neighboring one after another. The horizontal fin assembly 106 is disposed in the retainer 101, and comprises a plurality of horizontal fin members 105 disposed in the up/down direction in a manner neighboring one after another. Moreover, a substantially frame-shaped bezel 107 is installed onto the front surface of the retainer 101. An air conditioner (not shown) is installed onto the rear side of the retainer 101. Air blowing out from the air conditioner passes inside the retainer 101, and flows out to the outside through the inside of the substantially frame-shaped bezel 107. A window 108 is opened under the bezel 107 so that the space disposed below the retainer 101 communicates with the outside.

The vertical fin members 102 and the horizontal fin members 105 are formed as a substantially long strip shape, respectively, and have swing shafts at the longitudinal opposite ends. For example, the vertical fin members 102 swing in the right/left direction about the swing shafts 110 extending in the up/down direction. The horizontal fin members 105 swing in the up/down direction about the swing shafts 111 extending in the right/left direction. The vertical fin assembly is disposed on an upstream side of a ventilation passage formed in the retainer 101. The horizontal fin assembly 106 is disposed on a downstream side of the ventilation passage with respect to the vertical fin assembly.

The top swing shafts 110 of the vertical fin members 102 are fitted into a top wall 113 of the retainer 101, and are supported pivotably therein. The bottom swing shafts 110 of the vertical fin members 102 are fitted into a bottom wall 117 of the bezel 107, and are supported pivotably therein. Moreover, the bottom swing shafts 110 comprise a leading end extending under a bottom wall 116 of the retainer 101, respectively. Note that the leading end makes a vertical-fin connector 120 being bent rearward from the bottom swing shafts 110 and being re-bent downward. The vertical-fin connector 120 is supported pivotably in a substantially rod-shaped first link plate 121. The first link plate 121 is disposed outside and under the retainer 101, and extends in the right/left direction. The first link plate 121 comprises a vertical-fin-assembly operation knob 125 disposed at the substantially middle and extending forward. One of the opposite ends of the vertical-fin-assembly operation knob 125, the opposite end directing contrary to the opposite end integrated with the first link plate 121, is fitted into the window 108 of the bezel 107, and is exposed in front of the register 100.

Thus, the first link plate 121 connects the vertical fin members 102 with each other. When operating the vertical-fin-assembly operation knob 125 in the right/left direction, the first link plate 121 moves in the right/left direction. Accordingly, the vertical-fin connectors 120, a part of the bottom swing shafts 110 supported pivotably in the first link plate 121, move in the right/left direction. Consequently, the vertical fin members 102 swing synchronously about the swing shafts 110.

The horizontal fin members 105 comprise swing shafts 111 extending in the right/left direction. One of the swing shafts 111 is disposed at the bottom on the right-end side of the horizontal fin members 105 when the horizontal fin members 105 swing to the close position. The other one of the swing shafts 111 is disposed at the bottom on the left-end side of the horizontal fin members 105 when the horizontal fin members 105 swing to the close position. The right swing shafts 111 are fitted into a right wall 126 of the retainer 101, and are supported pivotably therein. The left swing shafts 111 are fitted into a left wall 127 of the retainer 101, and are supported pivotably therein. Moreover, the horizontal fin members 105 further comprise first horizontal-fin connectors 130, and second horizontal-fin connectors (not shown). The first horizontal-fin connectors 130 are disposed at the top on the left-end side of the horizontal fin members 105 when the horizontal fin members 105 swing to the close position. The second horizontal-fin connectors are disposed at the top on the right-end side of the horizontal fin members 105 when the horizontal fin members 105 swing to the close position. The first horizontal-fin connectors 130 are formed so as to extend leftward from the left-end side of the horizontal fin members 105, bend rearward temporarily and re-extend leftward. The second horizontal-fin connectors are formed so as to extend rightward from the right-end side of the horizontal fin members 105, bend rearward temporarily and re-extend rightward.

The first horizontal-fin connectors 130 are fitted into a substantially rod-shaped second link plate (not shown), and are supported pivotably therein. The second link plate is disposed on the left side in the retainer 101, and extends in the up/down direction. Moreover, the second horizontal-fin connectors are fitted into a substantially rod-shaped third link plate (not shown), and are supported pivotably therein. The third link plate is disposed on the right side in the retainer 101, and extends in the up/down direction.

One of the horizontal fin members 105, disposed at the substantially middle of the horizontal fin assembly 106 in the up/down direction, comprises a horizontal-fin-assembly operation knob 135. The one of the horizontal fin members 105 will be hereinafter specifically referred to as an operation horizontal fin member 131. As illustrated in FIG. 5, the horizontal-fin-assembly operation knob 135 is disposed at a slightly leftward position on the bottom-end side of the operation horizontal fin member 131 when the operation horizontal fin member 131 swings to the close position. Moreover, the horizontal-fin-assembly operation knob 135 is formed as a substantially disk shape, and is integrated with the operation horizontal fin member 131 so as to project the curved surface forward from the register 100. In addition, the horizontal fin member 105 neighboring under the operation horizontal fin member 131 is cut off at a part facing the horizontal-fin operation knob 135. Thus, the horizontal fin member 105 does not interfere with the horizontal-fin operation knob 135 when it swings.

The second link plate and third link plate connect the horizontal fin members 105 with each other. When operating the horizontal-fin operation knob 135 in the up/down direction, the second link plate and third link plate move in the up/down direction. Accordingly, the first horizontal-fin connectors 130 and second horizontal-fin connectors move in the up/down direction. Consequently, the horizontal fin members 105 swing synchronously about the swing shafts 111.

In the conventional register 100, the horizontal fin members 105 are disposed so that the front surfaces make a substantially flush surface when the horizontal fin members 105 swing to the close position. Therefore, as illustrated in FIGS. 5 and 6, the horizontal fin members 105 swung to the close position can close the outlet opening of the retainer 101.

Thus, in the conventional register 100, the horizontal fin members 105 swing to the close position to close the outlet opening of the retainer 101. Accordingly, it is possible to shut off air flowing out from the retainer 101. Consequently, when an air conditioner is provided with a plurality of the conventional registers 100, for instance, it is possible to freely shut off air flowing out from some of the retainers 101 by simply closing the objective retainers 100 of the conventional registers 100 alone.

Note that, however, the neighboring horizontal fin members 105 are disposed with a minute space provided therebetween in the conventional register 100. Therefore, when the horizontal fin members 105 swing to the close position to close the outlet opening of the retainer 101, air flowing within the retainer 101 has flowed out slightly through the minute spaces between the horizontal fin members 105.

Moreover, in order to inhibit the neighboring horizontal fin members 105 from interfering with each other when they are closing the outlet opening of the retainer 101, the horizontal fin members 105 are formed as the following shape. That is, a portion of the horizontal fin members 105, which is disposed on the top-end side when the horizontal fin members 105 swing to the close position, is inclined downward with respect to the blowing direction of air coming from inside the retainer 101. Accordingly, the air flowing out through the minute spaces between the horizontal fin members 105 flows out forward in the substantially horizontal direction.

Note that resisters are generally positioned adjacent to a user in order to supply the user air flowing from air conditioners. Consequently, the air, which has flowed out through the minute spaces between the horizontal fin members 105 of the conventional register 100 forward in the substantially horizontal direction, might collide directly with the user's body to give him or her unpleasant feelings.

Hence, engineering developments, which get rid of the minute spaces between horizontal fin members, have been made recently in order to inhibit air from flowing out through the closed outlet opening of retainers, for instance, as disclosed in Japanese Unexamined Patent Publication (KOKAI) No. 2004-34, 734.

In the register disclosed in Japanese Unexamined Patent Publication (KOKAI) No. 2004-34, 734, the neighboring horizontal members press with each other when they swing to the close position. The thus pressed neighboring horizontal fin members get rid of the minute spaces between them. Accordingly, air coming out from inside the retainer has been shut off. Consequently, it is possible to avoid the problem resulting from the air which collides directly with the user's body to give him or her unpleasant feelings.

In order to completely shut off the air coming out from inside the retainer when the outlet opening of the retainer is closed, it is required to assemble the horizontal fin members with high accuracy so as to equalize the loads for swinging the horizontal fin members to the close position. However, it is very difficult to assemble the horizontal fin members with such high accuracy that allows to completely shut off the air coming out from inside the retainer. Moreover, there arises another problem that the manufacturing cost of the register has gone up sharply. In addition, when the minute spaces between the neighboring horizontal fin members are removed to shut off the air coming out from inside the retainer, the air might flow out through the other portions of the retainer. If the thus flowed out air collides directly with the user, it has likewise given him or her unpleasant feelings.

SUMMARY OF THE INVENTION

It is therefore an object of the present invention to provide a register from which no air flows out to directly collide with users when its retainer is closed.

A register according to the present invention solves the aforementioned problems, and comprises:

a retainer formed as a cylinder shape substantially, demarcating a ventilation passage therein, and having an outlet opening; and a fin assembly comprising a plurality of fin members, the fin members formed as a strip shape substantially, having a swing shaft and disposed in the retainer in a manner neighboring one after another, whereby adjusting a blowing direction of air flowing out from the outlet opening of the retainer by swinging the fin members from a close position, at which an opening area of the outlet opening is minimum, to an opening position, at which the opening area of the outlet opening is maximum, or vice versa;

one of the neighboring paired fin members having a first end, the other one of the neighboring paired fin members having a second end facing the first end when the fin members swing to the close position;

the register further comprising an air deflector disposed between the first end and the second end, whereby deflecting the blowing direction of air flowing out from the outlet opening of the retainer outward when the fin members swing to the close position.

In the present register, the first end can preferably comprise an end of the one of the neighboring paired fin members, the end disposed outward when the fin members swing to the close position, and has a first air deflector surface forming the air deflector and inclined outward when the fin members swing to the close position.

Further, the first air deflector surface can preferably be inclined outward by an angle of 60 degrees or more with respect to the flowing direction of air coming from inside the ventilation passage when the fin members swing to the close position.

Furthermore, the second end can preferably have a second air deflector surface comprising an end surface of the other one of the neighboring paired fin members, disposed oppositely to the first air deflector surface when the fin members swing to the close position, forming the air deflector and disposed substantially parallel to the first air deflector surface when the fin members swing to the close position.

Moreover, the second end can preferably have a second air deflector surface comprising an end surface of the other one of the neighboring paired fin members, disposed oppositely to the first air deflector surface when the fin members swing to the close position, forming the air deflector and disposed unparallel to the first air deflector surface when the fin members swing to the close position; the first end can preferably further has a third air deflector surface disposed outermost when the fin members swing to the close position; and the third air deflector surface can preferably comprise a portion disposed parallel to the second air deflector surface and having a thickness-wise dimension shorter than that of the second air deflector surface.

The present register comprises the air deflector. When the outlet opening of the retainer is closed, that is, when the fin members swing to the close position, the air deflector deflects the blowing direction of air flowing out from the outlet opening of the retainer outward. The term, "outward," herein means directions in which the air flowing out from the outlet opening of the retainer (hereinafter simply referred as "leakage air") does not collide directly with a user's body when the fin members swing to the close position. For example, let us consider the case of disposing the present register in an automotive instrument panel. When the present register, which is disposed on the right side viewed from the driver's seat in a right-hand drive vehicle, deflects the blowing direction of leakage air between upward and rightward, the leakage air does not collide directly with a user who sit on the driver's seat or navigator's seat. Accordingly, in the thus disposed present register, the term, "outward," specifies directions between outward and rightward. On the other hand, when the present register, which disposed on the left side viewed from the navigator's seat in a right-hand drive vehicle, deflects the blowing direction of leakage air in directions between upward and leftward, the leakage air does not collide directly with the user. Consequently, in the thus disposed present register, the term, "outward," specifies directions between upward and leftward. Moreover, when the present register, which is disposed between the driver's seat and the navigator's seat in a right-hand or left-hand drive vehicle, deflects the blowing direction of leakage air upward, the leakage air does not collide directly with the user. Accordingly, in the thus disposed present register, the term, "outward," specifies upward. Note that, when the present register is disposed under the user's foot, for instance, the term, "outward," might specify downward.

In the present register, the air deflector comprises the space between the neighboring fin members disposed one after another. Therefore, it is possible to freely select the air deflecting directions specified by the term, "outward," depending on the swinging directions of the fin members. For example, when the fin members, which are disposed horizontally like the horizontal fin members 105 of the above-described conventional register 100, swing to close the outlet opening of the retainer, the swinging fin members can adjust the blowing direction of air in the up/down direction. Accordingly, the horizontally disposed fin members can deflect the blowing direction of leakage air upward or downward. Moreover, when the fin members, which are disposed vertically, swing to close the outlet opening of the retainer, the swinging fin members can adjust the blowing direction of leakage air in the right/left direction. Consequently, the vertically disposed fin members can deflect the blowing direction of leakage air rightward or leftward. In addition, when the fin members are disposed obliquely one after another, it is possible to deflect the blowing direction of leakage air between upward and rightward, upward and leftward, downward and rightward, or downward and leftward.

The present register thus deflects the blowing direction of leakage air outward with the air deflector. Therefore, the present register can inhibit the leakage air from colliding directly with the user.

Moreover, the present register inhibits the leakage air, not by pressing the horizontal fin members to each other as in the conventional register disclosed in Japanese Unexamined Patent Publication (KOKAI) No. 2004-34, 734, but by deflecting the blowing direction of leakage air outward, that is, in a direction in which the leakage current does not collide directly with the user. Accordingly, the present register can be manufactured at reduced cost, because it is not required to assemble the horizontal and/or vertical fin members with high accuracy as required when assembling the conventional register disclosed in the Japanese patent publication. In addition, the present register does not shut off the leakage air at all. Consequently, no air leaks out through portions of the present register other than the outlet opening of the retainer so that there hardly arises fear that air coming out from the present register gives unpleasant feelings to the user.

In the present register, the air deflector is disposed between the first end of one of the neighboring paired fin members and the second end of the other one of the neighboring paired fin members. The first end and the second end face to each other when the fin members swing to the close position. In the present register, it is preferable that the first end can comprise an end of the one of the neighboring paired fin members, and can have a first air deflector surface. Note the end of the one of the neighboring paired fin members is disposed outward when the fin members swing to the close position, and that the first air deflector surface forms the air deflector and is inclined outward when the fin members swing to the close position. The present register provided with such a simple arrangement can deflect the blowing direction of leakage air outward more securely.

Moreover, it is possible to deflect the blowing direction of leakage air much more securely when the preferable arrangement of the present register is further modified as set forth in following a), b) and c):

a) The first deflector surface can preferably be inclined outward by an angle of 60 degrees or more with respect to the flowing direction of air coming from inside the ventilation passage when the fin members swing to the close position;

b) The second end can preferably have a second air deflector surface comprising an end surface of the other one of the neighboring paired fin members, disposed oppositely to the first air deflector surface when the fin members swing to the close position, forming the air deflector and disposed substantially parallel to the first air deflector surface when the fin members swing to the close position; and c) The second end can preferably have a second air deflector surface comprising an end surface of the other one of the neighboring paired fin members, disposed oppositely to the first air deflector surface when the fin members swing to the close position, forming the air deflector and disposed unparallel to the first air deflector surface when the fin members swing to the close position; the first end can preferably further have a third air deflector surface disposed outermost when the fin members swing to the close position; and the third air deflector surface can preferably comprise a portion disposed parallel to the second air deflector surface and having a thickness-wise dimension shorter than that of the second air deflector surface.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
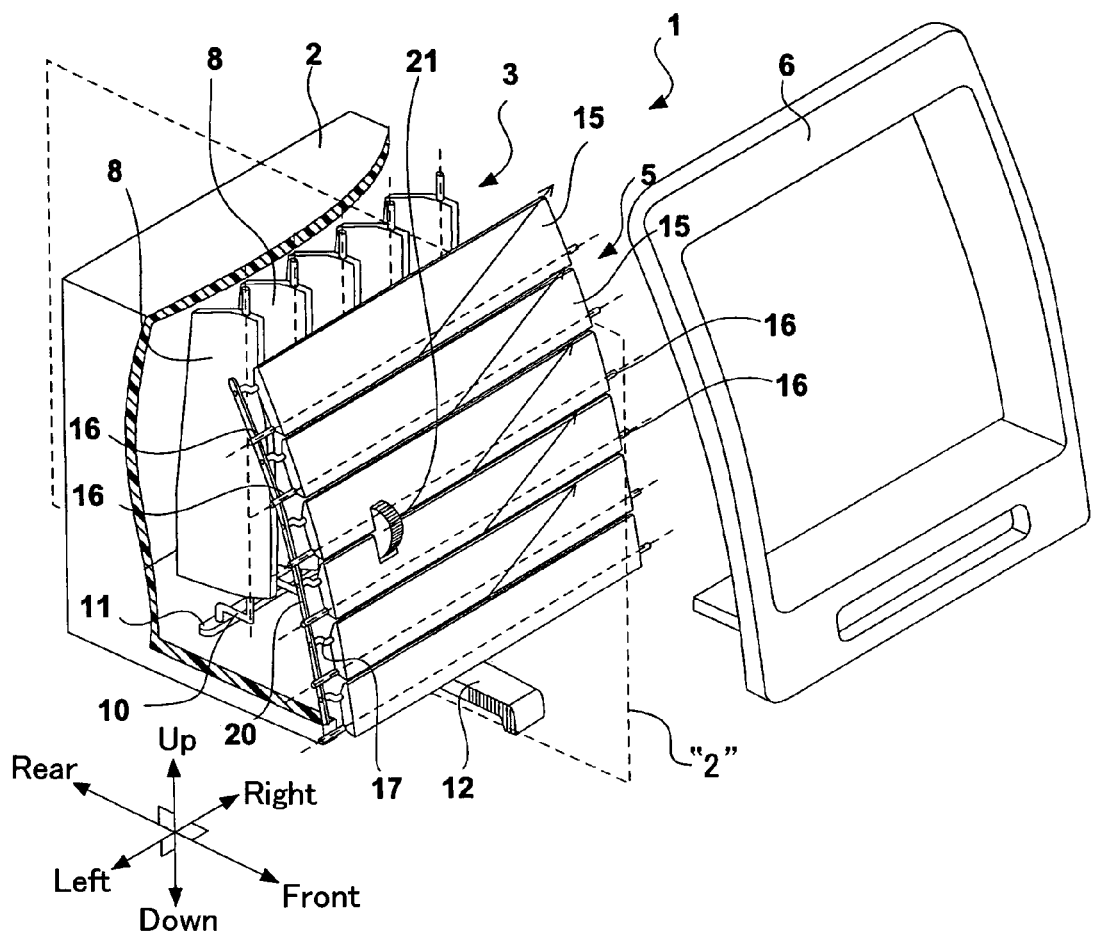
FIG. 1 is a perspective view for schematically illustrating a register according to Example No. 1 of the present invention.

Having generally described the present invention, a further, understanding can be obtained by reference to the specific preferred embodiments which are provided herein for the purpose of illustration only and not intended to limit the scope of the appended claims.

The present register comprises a retainer, and a fin assembly. The fin assembly comprises a plurality of fin members. The fin members swing about their swing shafts, respectively, to adjust the blowing direction of air flowing out from an outlet opening of the retainer. Moreover, the fin members swing about their swing shafts, respectively, to control the flow volume of air flowing out from the outlet opening of the retainer.

The present register can further comprise various component parts in addition to the retainer and fin assembly. For example, the present register can further comprise a variety of known component parts disposed in conventional registers, such as linking member for synchronizing the swinging fin members, an operation knob for operating the fin assembly and driving means for automatically swinging the fin members, combined with the retainer and fin assembly.

The fin assembly can be a horizontal fin assembly or a vertical fin assembly whose constructions have been known. As described above, a horizontal fin assembly comprises a plurality of fin members which are disposed one after another in the up/down direction to adjust the blowing direction of air in the up/down direction. A vertical fin assembly comprises a plurality of fin members which are disposed one after another in the right/left direction to adjust the blowing direction of air in the right/left direction. Moreover, the fin assembly can comprise two or more fin assemblies combinedly. In this instance, the fin assemblies can preferably be disposed so as to orient their component fin members, which are disposed one after another, substantially perpendicularly to each other. Thus, it is possible to adjust the flowing direction of air in various directions.

Note that, when the fin assembly comprises two or more fin assemblies combinedly, one of the two or more fin assemblies closing the outlet opening of the retainer can preferably be disposed on a downstream side with respect to the other one of the two or more fin assemblies in the blowing direction of air in order to prevent the other one of the two or more fin assemblies from interfering with the one of the two or more fin assemblies closing the outlet opening of the retainer.

The present register can be so-called fin shut-off registers in which the fin members of the fin assembly are disposed substantially flush with each other when the fin members swing to the close position to close the outlet opening of the retainer. Alternatively, the present register can be those registers in which the fin members of the fin assembly swing to reduce the opening degree of the outlet opening of the retainer. Moreover, the present register can further comprise a damper disposed on an upstream side with respect to the fin assembly in the blowing direction of air. In this instance, it is possible to open and/or close the outlet opening of the retainer not only by the fin assembly but also by the damper.

EXAMPLES

Hereinafter, the present invention will be described with reference to registers according to examples of the present invention.

Example No. 1

Figure 2:
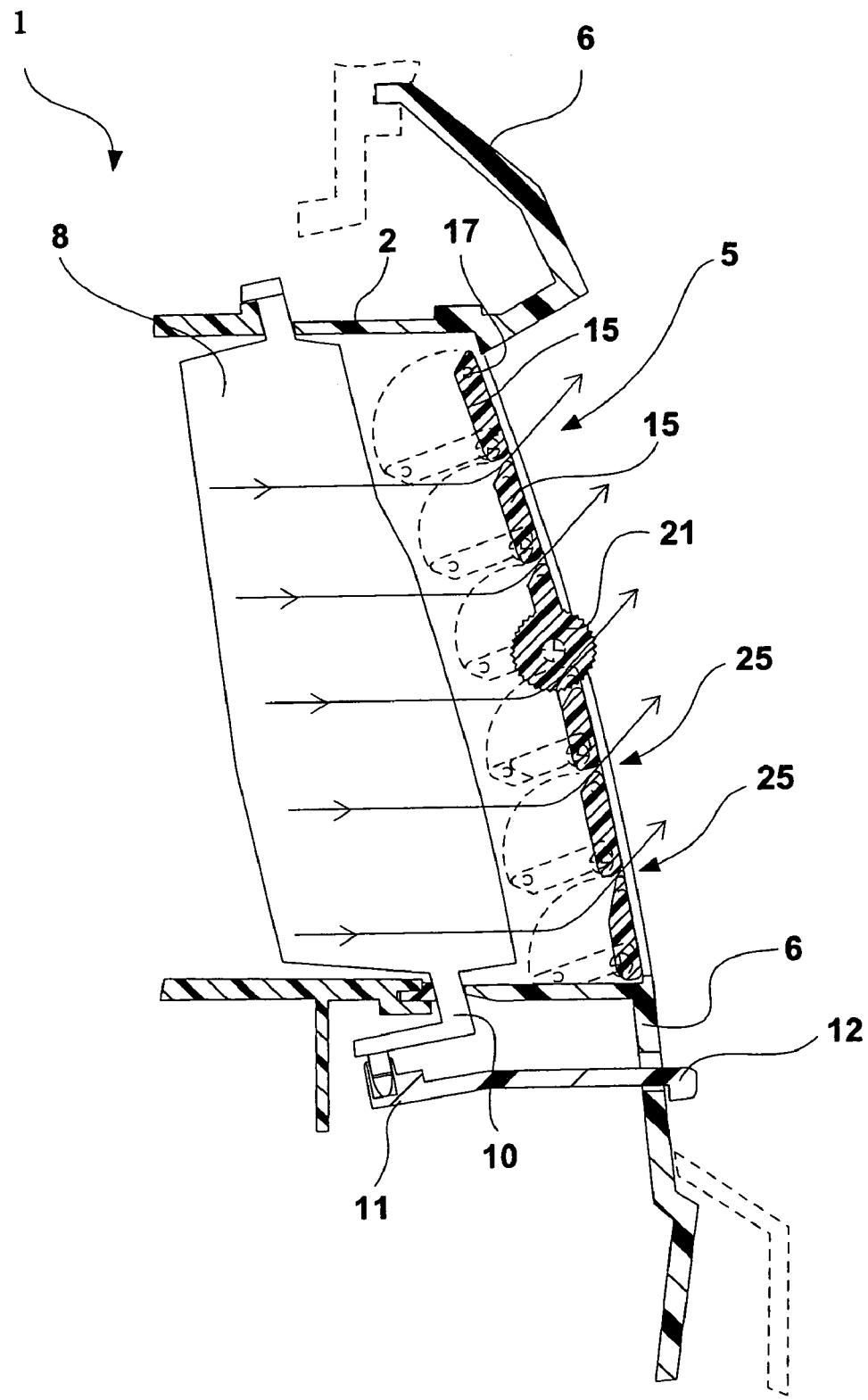
FIG. 2 is a cross-sectional view for schematically illustrating the register according to Example No. 1 of the present invention, cross-sectional view which is taken along the plane "2"of FIG. 1 designated with dotted lines.
Figure 3:
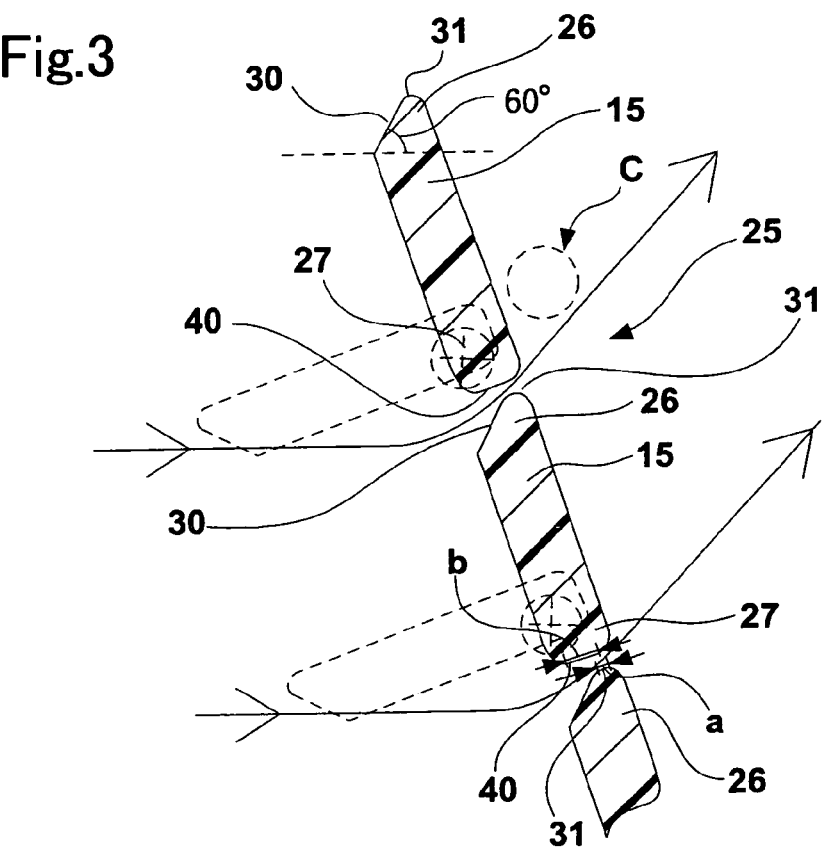
FIG. 3 is ah enlarged cross-sectional view on major parts of FIG. 2.

A register according to Example No. 1 of the present invention is disposed in a vehicle instrument panel, and is positioned between the driver's seat and navigator's seat of a right-hand drive vehicle when viewed from the rear passenger's seat. The register comprises a retainer, and a horizontal fin assembly opening and/or closing an outlet opening of a retainer. FIG. 1 schematically illustrates a perspective view of the register. FIG. 2 schematically illustrates a cross-sectional view of the register, which is cut along the plane "2" of FIG. 1 designated with dotted lines. FIG. 3 illustrates an enlarged cross-sectional view on major parts of FIG. 2. Note that the perspective view labeled FIG. 1 shows how the register appears when a bezel, one of the component parts, is disassembled forward, as well as when the retainer is cut off at the front portion.

Figure 5:
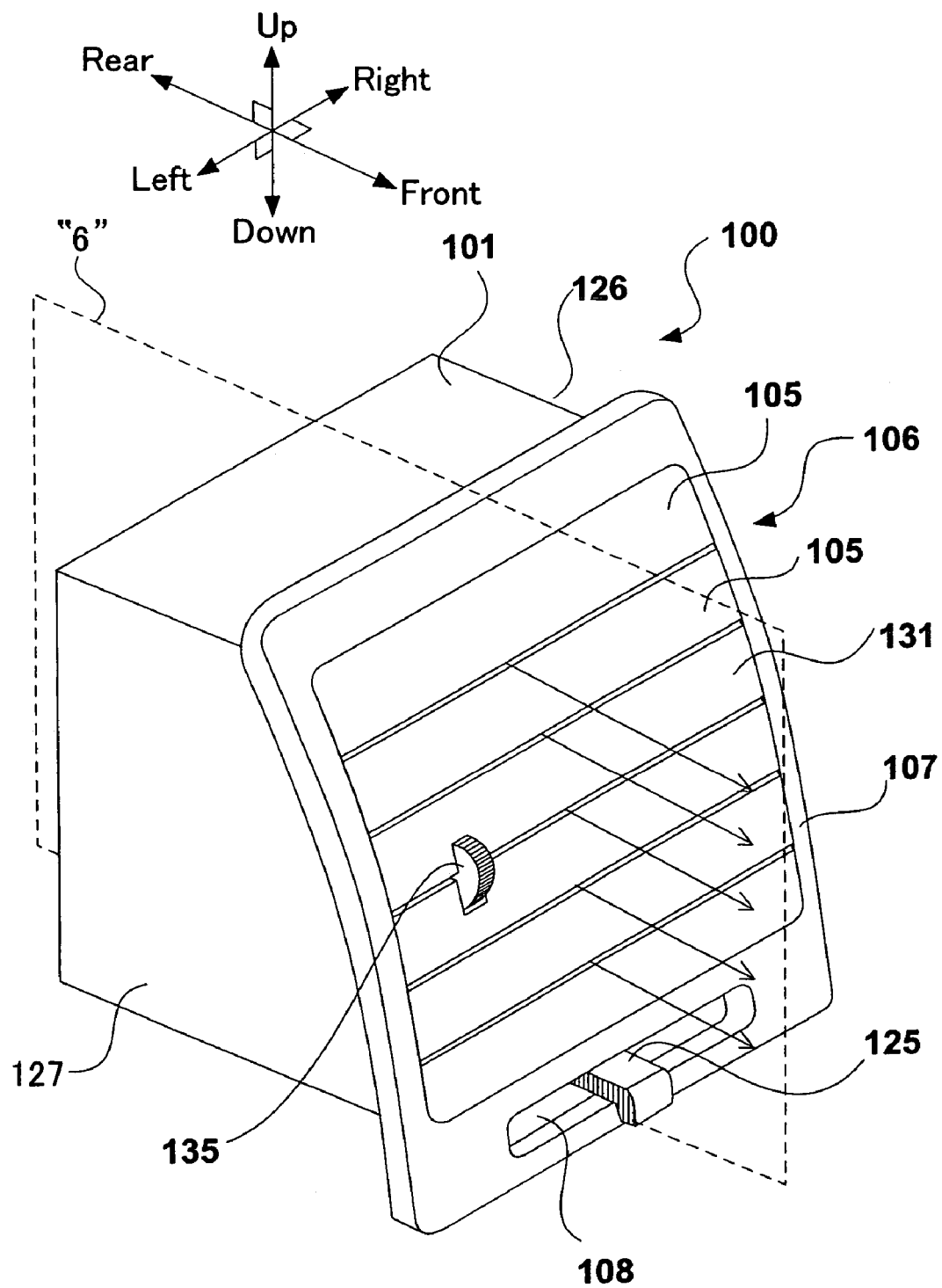
FIG. 5 is a perspective view for schematically illustrating the conventional register 100.
Figure 6:
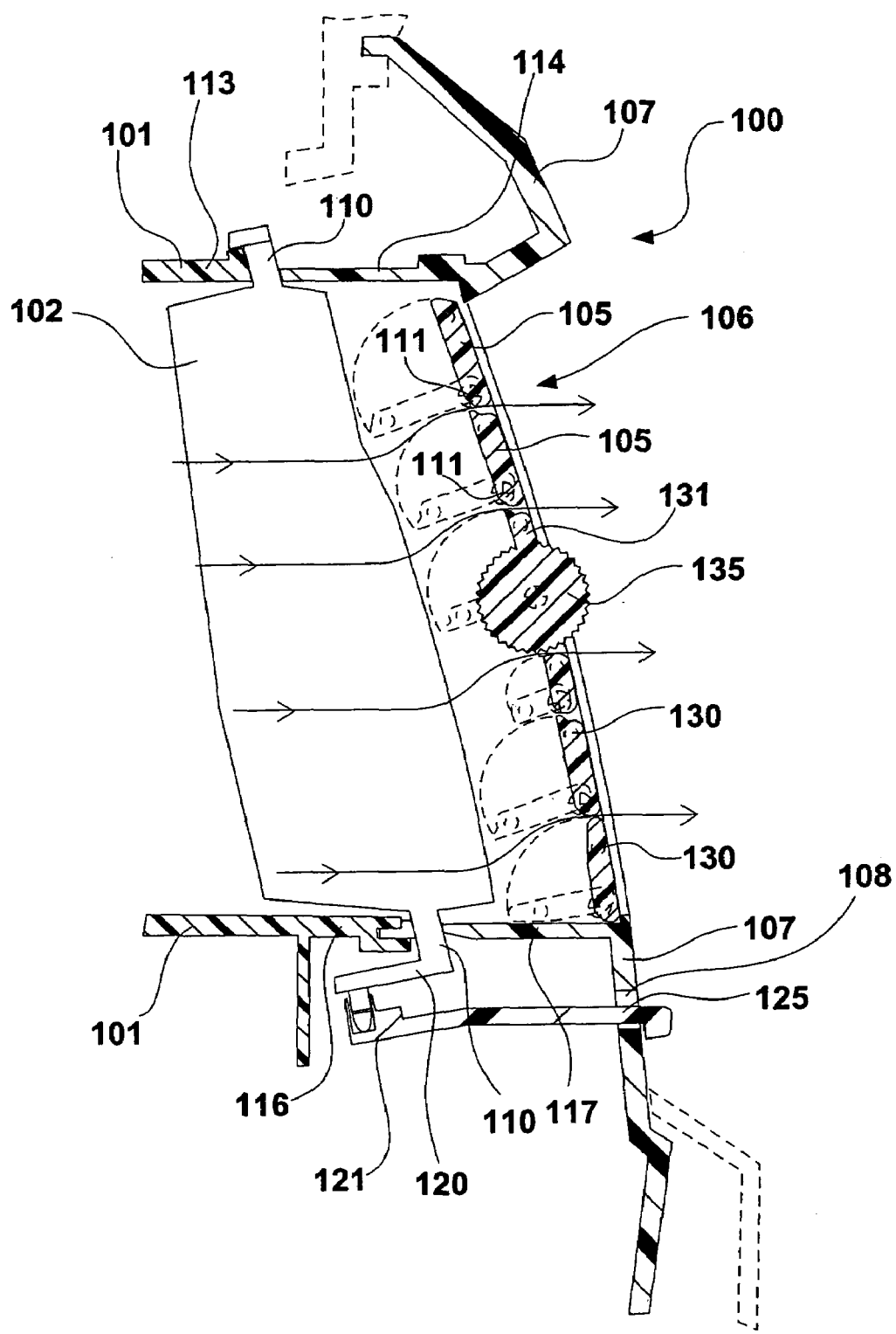
FIG. 6 is a cross-sectional view for schematically illustrating the conventional register 100, cross-sectional view which is taken along the plane "6" of FIG. 5 designated with dotted lines.

As illustrated in the drawings, a register 1 according to Example No. 1 of the present invention comprises a retainer 2, a vertical fin assembly 3, a horizontal fin assembly 5, and a bezel 6. Note that the retainer 2, the vertical fin assembly 3 and the bezel 6 are made in the same manner as those of the conventional register 100 illustrated in FIGS. 5 and 6, respectively. Thus, the vertical fin assembly 3 comprises a plurality of vertical fin members 8, a vertical-fin connector 10, a first link plate 11, and a vertical-fin-assembly operation knob 12, which are made in the same manner as those of the conventional register 100 illustrated in FIGS. 5 and 6. Accordingly, when operating the vertical-fin-assembly operation knob 12, the vertical-fin connector 10 and first link plate 11 swing the vertical fin members 8 in the right/left direction synchronously. Moreover, the vertical fin assembly 3 is disposed on an upstream side of a ventilation passage formed in the retainer 2 in the flowing direction of air coming from inside the retainer 2. In addition, the horizontal fin assembly 5 is disposed on a downstream side of the ventilation passage with respect to the vertical fin assembly 3 in the flowing direction of air.

The horizontal fin assembly 5 comprises a plurality of horizontal fin members 15. The horizontal fin members 15 are formed as a substantially long strip shape, respectively. The horizontal fin members 15 have opposite swing shafts 16 disposed at the lengthwise opposite ends. The opposite swing shafts 16 are fitted into the opposite side walls of the retainer 2, and are supported pivotably therein. Moreover, the horizontal fin assembly 5 further comprises a first horizontal-fin connector 17, a second horizontal-fin connector (not shown), a second link plate 20, a third link plate (not shown), and a horizontal-fin-assembly operation knob 21, which are made in the same manner as those of the conventional register 100 illustrated in FIGS. 5 and 6. Accordingly, when operating the horizontal-fin-assembly operation knob 21, the first horizontal-fin connector 17, second horizontal-fin connector, second link plate 20 and third link plate swing the horizontal fin members 15 in the up/down direction synchronously.

As illustrated in FIG. 2, the register 1 according to Example No. 1 of the present invention comprises air deflectors 25. The air deflectors 25 are disposed between the neighboring paired horizontal fin members 15, respectively. Specifically, as illustrated in FIG. 3, each of the air deflectors 25 is disposed between a first end 26 of one of the neighboring paired horizontal fin members 15 and a second end 27 of the other one of the neighboring paired horizontal fin members 15. Note that one of the opposite ends of the one of the neighboring paired horizontal fin members 15, which is disposed outward when the one of the neighboring paired horizontal fin members 15 swings to the close position, makes the first end 26; and that one of the opposite ends of the other one of the neighboring paired horizontal fin members 15, which is disposed to face the first end 26 when the other one of the neighboring paired horizontal fin members 15 swings to the close position, makes the second end 27.

In the register 1 according to Example No. 1 of the present invention, the first ends 26 comprise a first deflector surface 30, and a third deflector surface 31, respectively. The first deflector surface 30 inclines upward when the one of the neighboring paired horizontal fin members 15 swings to the close position. The third deflector surface 31 is disposed outermost when the one of the neighboring paired horizontal fin members 15 swings to the close position. Moreover, in the register 1, the first guide surfaces 30 are inclined upward by an angle of 60 degrees with respect to the blowing direction of air coming from inside the retainer 2, respectively, for instance. In addition, in the register 1, the horizontal fin members 15 are disposed substantially horizontally so that the lines connecting the opposite swing shafts 16 extend in the right/left direction substantially perpendicular to the horizontal direction in FIG. 3.

The second ends 27 comprise a second deflector surface 40, respectively. The second deflector surfaces 40 make opposite end surfaces of the horizontal fin members 15 which are disposed oppositely to the first deflector surfaces 30 when the horizontal fin members 15 swing to the close position, or specifically, the lower end surfaces of the horizontal fin members 15 in FIG. 3 when the horizontal fin members 15 swing to the close position. Note that the second deflector surfaces 40 extend linearly at a predetermined angle with respect to the blowing direction of air coming from inside the retainer 1. Therefore, in the register 1 according to Example No. 1 of the present invention, the first deflector surfaces 30 and the second deflector surfaces 40 are disposed unparallel to each other to cross with each other in the extensions.

The third deflector surfaces 31 comprise a portion, which is disposed substantially parallel to the second deflector surfaces 40 when the horizontal fin members 15 swing to the close portion, respectively. The portions have a thickness-wise dimension "a" shorter than a thickness-wise dimension "b" of the second deflector surfaces 40. Moreover, the third deflector surfaces 31 are separated from the second deflector surfaces 40 by a distance of about 0.5 mm when the horizontal fin members 15 swing to the close position.

In the register 1 according to Example No. 1 of the present invention, air is supplied from an air conditioner (not shown) into the ventilation passage formed in the retainer 2. The air flows forward to the downstream side of the ventilation passage in the flowing direction of air through the spaces between the vertical fin members 8 of the vertical fin assembly 3. When the horizontal fin members 15 of the horizontal fin assembly 5 swing to the close position, the air flows out forward through the outlet opening of the retainer 2 via the air deflectors 25, the spaces between the horizontal fin members 15.

In this instance, the first ends 26 deflect the blowing direction of air reaching the air deflectors 25 upward along the first deflector surfaces 30, because the first deflectors 30 incline upward by 60 degrees with respect to the blowing of air coming from inside the retainer 2.

Moreover, negative pressures arise in spaces "C" in front of the second ends 27, because the third deflector surfaces 31 comprise the portion, which is disposed substantially parallel to the second deflector surfaces 40 when the horizontal fin members 15 swing to the close portion, respectively. Note that the portions have the thickness-wise dimension "a" shorter than the thickness-wise dimension "b" of the second deflector surfaces 40. Therefore, the resulting negative pressures deflect the blowing direction of air passing between the second deflector surfaces 40 and the third deflector surfaces 31 furthermore upward.

All in all, the register 1 according to Example No. 1 of the present invention can securely deflect the blowing direction of air coming out from the outlet opening of the retainer 2 upward. Accordingly, it is possible to inhibit the leakage air from colliding directly with the user. Thus, the leakage air hardly gives unpleasant feelings to the user. Moreover, the register 1 does not shut off the leakage air, but deflects the blowing direction of air in order to inhibit the leakage air from colliding directly with the user. Consequently, it is not required at all to assemble the horizontal fin members 15 with high accuracy. As a result, it is possible to manufacture the register 1 at reduced cost.

Moreover, the register 1 according to Example No. 1 of the present invention lets the leakage air flow out through the air deflectors 25 alone. Accordingly, no air flows out through the other portions of the register 1. Consequently, no air coming out from the register 1 gives unpleasant feelings to the user.

As described above, the register 1 according to Example No. 1 of the present invention deflects the blowing direction of leakage air upward through the air deflectors 25. Accordingly, the leakage air involves, for example, air flowing out through the spaces between the horizontal-fin-assembly operation knob 21 and the horizontal fin members 15 neighboring therewith, and deflects the blowing direction of leakage air upward. Consequently, in this instance as well, the air does not collide directly with the user to give him or her unpleasant feelings. When minimizing the spaces between the horizontal-fin-assembly operation knob 21 and the horizontal fin members 15 neighboring therewith, it is possible to reduce the volume of air flowing out through the spaces. Thus, it is possible to more reliably inhibit the air from colliding directly with the user. In the register 1, the spaces between the horizontal-fin-assembly operation knob 21 and the horizontal fin members 15 neighboring therewith are designed to have a width of about 0.25 mm (i.e., about a half of the width of the air deflectors 25) when the horizontal fin members 15 swing to the close position. The smaller the width of the spaces is, the more reliably the register 1can deflect the blowing direction of air flowing out through the spaces upward. The width of spaces other than the air deflectors 25, for instance, the width of the spaces between the horizontal-fin-assembly operation knob 21 and the horizontal fin members 15 neighboring therewith can preferably be smaller than the width of the air deflectors 25. Specifically, the width of the spaces can desirably be smaller than the width of the air deflectors 25 by a half or less.

Moreover, when the horizontal-fin-assembly operation knob 21 is disposed more upward (i.e., more "outward" in general) so as to position the spaces between the horizontal-fin-assembly operation knob 21 and the horizontal fin members 15 neighboring therewith more upward, the leakage air can more reliably deflect the blowing direction of air, which flows out through the spaces between the horizontal-fin-assembly operation knob 21 and the horizontal fin members 15 neighboring therewith, upward.

The register 1 according to Example No. 1 of the present invention comprises the first deflector surfaces 30, which incline upward by 60 degrees with respect to the flowing direction of air coming from inside the retainer 2 when the horizontal fin members 15 swing to the close position. Note that, however, the first deflector surfaces 30, which incline slightly upward with respect to the flowing direction of air coming from inside the retainer 2 when the horizontal fin members 15 swing to the close position, can likewise operate and effect advantages. Moreover, the larger the inclination angle of the first deflector surfaces 30 is, the more upward the first deflector surfaces 30 deflect the blowing direction of leakage air.

In the register 1 according to Example No. 1 of the present invention, the air deflectors 25 are disposed between the neighboring paired horizontal fin members 15, and the first deflector surfaces 30 incline upward when the horizontal fin members 15 swing to the close position, because the term, "upward" specified in the register 1, is adapted to be the generic term, "outward," in which the leakage air does not collide directly with the user. However, the air deflectors 25 can be disposed between the neighboring paired vertical fin members 8; or the first deflector surfaces 30 can incline in the other directions, when the terms, "rightward," "leftward" and "downward" specified in the register 1, are adaptable to the generic term, "outward."

For example, the air deflectors 25 can be disposed between the neighboring paired horizontal fin members 15; and the first deflector surfaces 30 can incline downward when the horizontal fin members 15 swing to the close position, if the term, "downward" specified in the register 1 according to Example No. 1 of the present invention is adaptable to the generic term, "outward." Moreover, the air deflectors 25 can be disposed between the neighboring paired vertical fin members 8; and the first deflector surfaces 30 can incline rightward when the vertical fin members 8 swing to the close position, if the term, "rightward" specified in the register 1 is adaptable to the generic term, "outward." In addition, the air deflectors 25 can be disposed between the neighboring paired vertical fin members 8; and the first deflector surfaces 30 can incline leftward when the vertical fin members 8 swing to the close position, if the term, "leftward" specified in the register 1 is adaptable to the generic term, "outward." Note that, in all of the instances, the first deflector surfaces 30 can preferably incline by an angle of 60 degrees or more with respect to the flowing direction of air coming from inside the retainer 2 when the horizontal fin members 15 or the vertical fin members 8 swing to the close position.

The register 1 according to Example No. 1 of the present invention comprises the second deflector surfaces 40, which are formed linearly so as to incline slightly upward with respect to the horizontal direction, specifically, with respect to the blowing direction of air coming from inside the retainer. 2, when the horizontal fin members 15 swing to the close position. Alternatively, the second deflector surfaces 40 can be disposed in the horizontal direction, that is, parallel to the blowing direction of air coming from inside the retainer 2, when the horizontal fin members 15 swing to the close position. However, the second deflector surfaces 40, which incline upward by an angle of more than 0 degree with respect to the horizontal direction, or with respect to the blowing direction of air coming from inside the retainer 2, when the horizontal fin members 15 swing to the close position, can deflect the blowing direction of leakage air upward more reliably. Moreover, even when the air deflectors 25 are disposed between the neighboring paired vertical fin members 8, or even when the other directions, such as "downward," "rightward" and "leftward" specified in the register 1, are adaptable to the generic term, "outward," the second deflector surfaces 40 can preferably incline outward by an angle of more than 0 degree with respect to the blowing direction of air coming from inside the retainer 2 when the horizontal fin members 15 or the vertical fin members 8 swing to the close position.

Example No. 2

Figure 4:
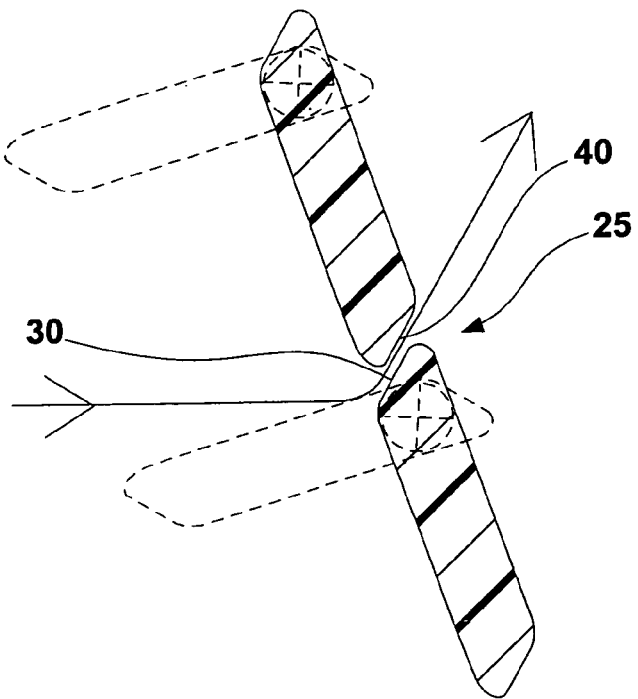
FIG. 4 is an enlarged cross-sectional view for schematically illustrating a register according to Example No. 2 of the present invention, a modified version of the air deflector according to the present register.

A register according to Example No. 2 of the present invention will be hereinafter described with reference to FIG. 4. As illustrated in the drawing, the register according to Example No. 2 comprises the same components as those of the register 1 according to Example No. 1 except that the second deflector surfaces 40 are disposed differently. Specifically, the second deflector surfaces 40 are disposed substantially parallel to the neighboring paired first deflector surfaces 30, which are counterparts to the second deflector surfaces 40 to form the air deflectors 25 together with the second deflector surfaces 40, when the horizontal fin members 15 swing to the close position. Thus, the air deflectors 25, the spaces between the first deflector surfaces 30 and the second deflector surfaces 40, deflect the blowing direction of air coming from inside the retainer 2 completely upward along the parallelly disposed first deflector surfaces 30 and second deflector surfaces 40, because the air deflectors 25 incline upward with respect to the blowing direction of air coming from inside the retainer 2 when the horizontal fin members 15 swing to the close position. As a result, the register according to Example No. 2 can reliably deflect the blowing direction of leakage air upward as well.

Having now fully described the present invention, it will be apparent to one of ordinary skill in the art that many changes and modifications can be made thereto without departing from the spirit or scope of the present invention as set forth herein including the appended claims.

What is claimed is:

1. A register, comprising:
   a retainer formed as a cylinder shape substantially, demarcating a ventilation passage therein, and having an outlet opening; and
   a fin assembly comprising a plurality of fin members, the fin members formed as a strip shape substantially, having a swing shaft and disposed in the retainer in a manner neighboring one after another, thereby adjusting a blowing direction of air flowing out from the outlet opening of the retainer by swinging the fin members from a close position, at which an opening area of the outlet opening is minimum, to an opening position, at which the opening area of the outlet opening is maximum, or vice versa;
   one of the neighboring paired fin members having a first end, the other one of the neighboring paired fin members having a second end facing the first end when the fin members swing to the close position, a space being formed between the first end and the second end when the fin members are disposed in the close position;
   the register further comprising an air deflector disposed between the first end and the second end, thereby deflecting the blowing direction of air flowing out from the outlet opening of the retainer outward and upward when the fin members swing to the close position,
   wherein the first end comprises an end of the one of the neighboring paired fin members, the end disposed outward when the fin members swing to the close position, and has a first air deflector surface forming the air deflector and inclined outward when the fin members swing to the close position,
   wherein the first air deflector surface is inclined upward from an inside of the ventilation passage toward an outside of the outlet opening by an angle of 60 degrees or more with respect to the flowing direction of air coming from inside the ventilation passage when the fin members swing to the close position.

2. The register set forth in claim 1, wherein the second end has a second air deflector surface comprising an end surface of the other one of the neighboring paired fin members, disposed oppositely to the first air deflector surface when the fin members swing to the close position, forming the air deflector and disposed substantially parallel to the first air deflector surface when the fin members swing to the close position.

3. The register set forth in claim 1, wherein:
   the second end has a second air deflector surface comprising an end surface of the other one of the neighboring paired fin members, disposed oppositely to the first air deflector surface when the fin members swing to the close position, forming the air deflector and disposed unparallel to the first air deflector surface when the fin members swing to the close position;
   the first end further has a third air deflector surface disposed outermost when the fin members swing to the close position; and
   the third air deflector surface comprises a portion disposed parallel to the second air deflector surface and having a thickness-wise dimension shorter than that of the second air deflector surface.

4. The register set forth in claim 1, further comprising a plurality of vertical fins disposed in the retainer in an upstream side of the ventilation passage, wherein the fin members are horizontal,
   wherein the fin assembly is disposed in a downstream side of the ventilation passage.

5. The register set forth in claim 1, wherein a thickness of the first end is shorter than a thickness of the second end.

* * * * *